US012578611B2

(12) United States Patent
Li et al.

(10) Patent No.: US 12,578,611 B2
(45) Date of Patent: Mar. 17, 2026

(54) ELECTRONIC PAPER DISPLAY DEVICES AND MANUFACTURING METHODS THEREOF

(71) Applicant: Guangzhou China Star Optoelectronics Semiconductor Display Technology Co., Ltd., Guangzhou (CN)

(72) Inventors: Ji Li, Guangzhou (CN); Wenliang Huang, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 305 days.

(21) Appl. No.: 18/525,916

(22) Filed: Dec. 1, 2023

(65) Prior Publication Data

US 2025/0147376 A1      May 8, 2025

(30) Foreign Application Priority Data

Nov. 2, 2023    (CN) .......................... 202311451525.2

(51) Int. Cl.
| | |
|---|---|
| *G02F 1/1677* | (2019.01) |
| *G02F 1/167* | (2019.01) |
| *G02F 1/1675* | (2019.01) |

(52) U.S. Cl.
CPC ............ *G02F 1/1677* (2019.01); *G02F 1/167* (2013.01); *G02F 2001/1678* (2013.01)

(58) Field of Classification Search
CPC ...... G02F 1/1677; G02F 1/167; G02F 1/1679; G02F 1/1681; G02F 1/1676; G02F 1/16757; G02F 1/133514; G02F 1/13473; G02F 2001/1678; F21K 9/64; H10K 59/38
See application file for complete search history.

(56) References Cited

U.S. PATENT DOCUMENTS

2017/0123265 A1* 5/2017 Wang ................ G02F 1/133377

* cited by examiner

*Primary Examiner* — Angela M. Medich
(74) *Attorney, Agent, or Firm* — PV IP PC; Wei Te Chung

(57) ABSTRACT

Electronic paper display devices and manufacturing methods thereof are provided. The electronic paper display device includes an upper substrate, a lower substrate, and an electrophoretic display layer. A side of the upper substrate is provided with a first electrode layer thereon. A side of the lower substrate facing the first electrode layer is provided with a second electrode layer thereon. The first electrode layer and the second electrode layer are arranged opposite to each other at a preset interval. The electrophoretic display layer is disposed between the first electrode layer and the second electrode layer, and includes a color resistance layer and a black matrix. The black matrix has openings, the color resistance layer includes a plurality of color resistance blocks arranged corresponding to the openings. Each color resistance block is provided with a micro-cavity, and the micro-cavity is filled with electronic ink containing black and white particles.

18 Claims, 9 Drawing Sheets

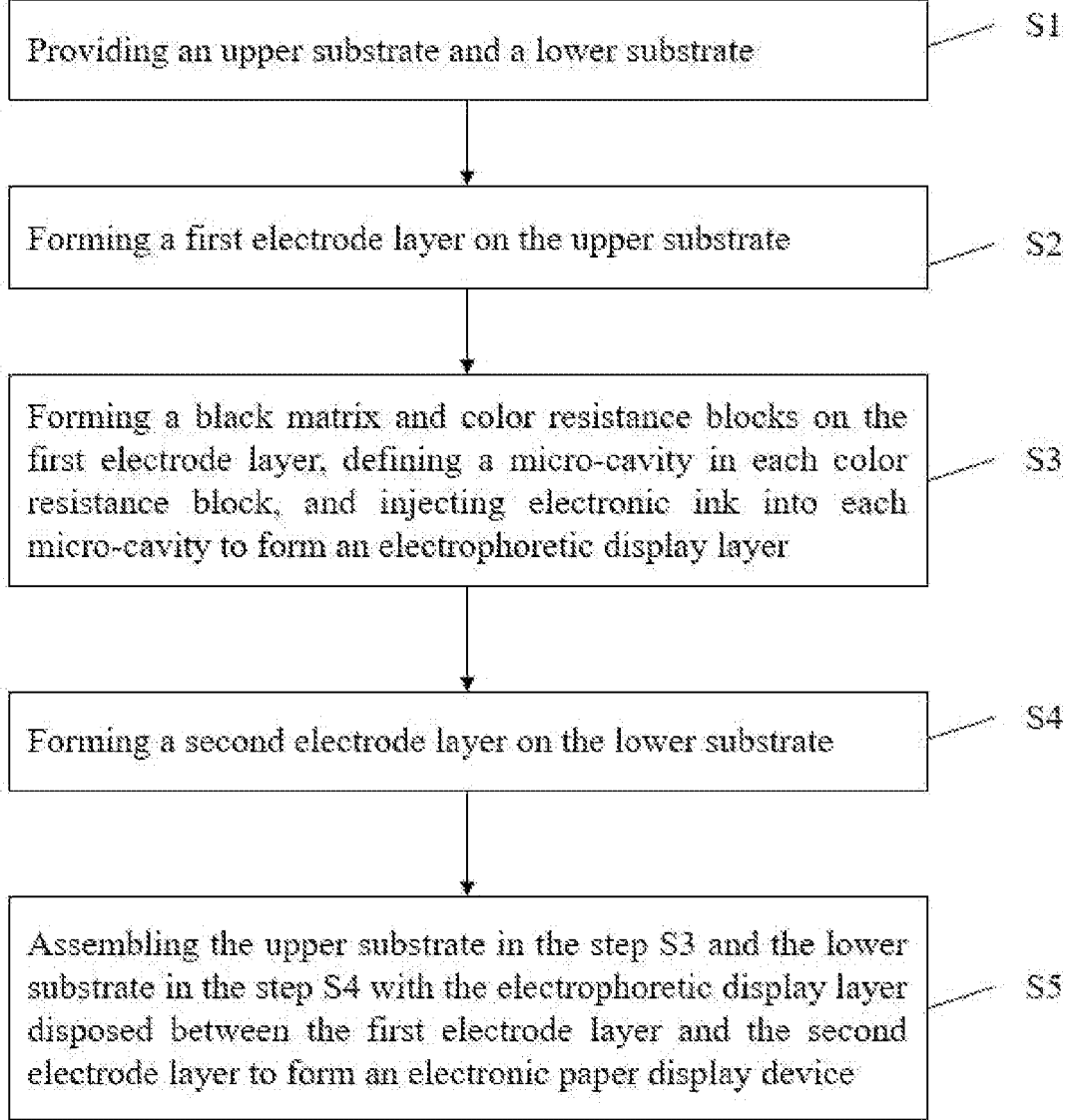

Providing an upper substrate and a lower substrate — S1

Forming a first electrode layer on the upper substrate — S2

Forming a black matrix and color resistance blocks on the first electrode layer, defining a micro-cavity in each color resistance block, and injecting electronic ink into each micro-cavity to form an electrophoretic display layer — S3

Forming a second electrode layer on the lower substrate — S4

Assembling the upper substrate in the step S3 and the lower substrate in the step S4 with the electrophoretic display layer disposed between the first electrode layer and the second electrode layer to form an electronic paper display device — S5

FIG. 6

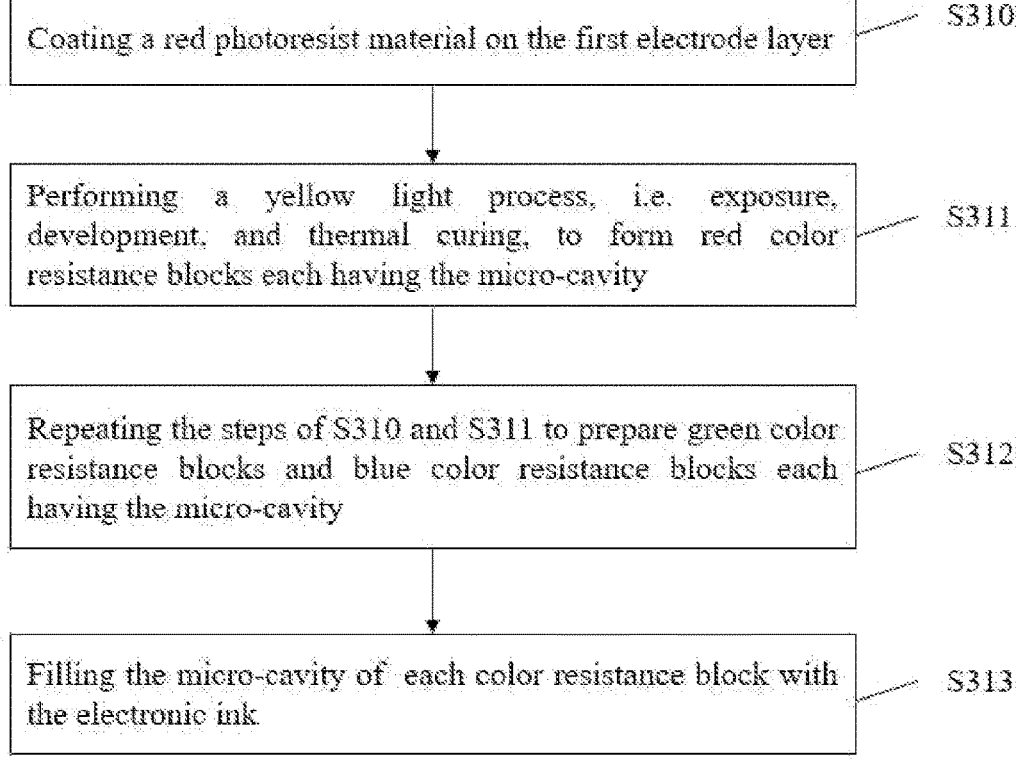

Coating a red photoresist material on the first electrode layer — S310

Performing a yellow light process, i.e. exposure, development, and thermal curing, to form red color resistance blocks each having the micro-cavity — S311

Repeating the steps of S310 and S311 to prepare green color resistance blocks and blue color resistance blocks each having the micro-cavity — S312

Filling the micro-cavity of each color resistance block with the electronic ink — S313

FIG. 7

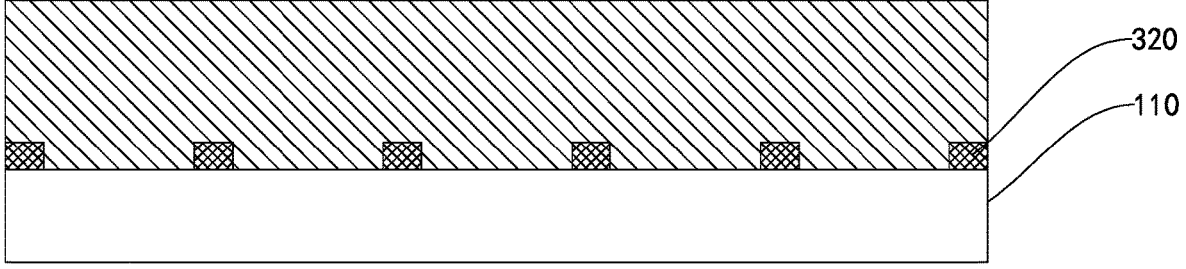

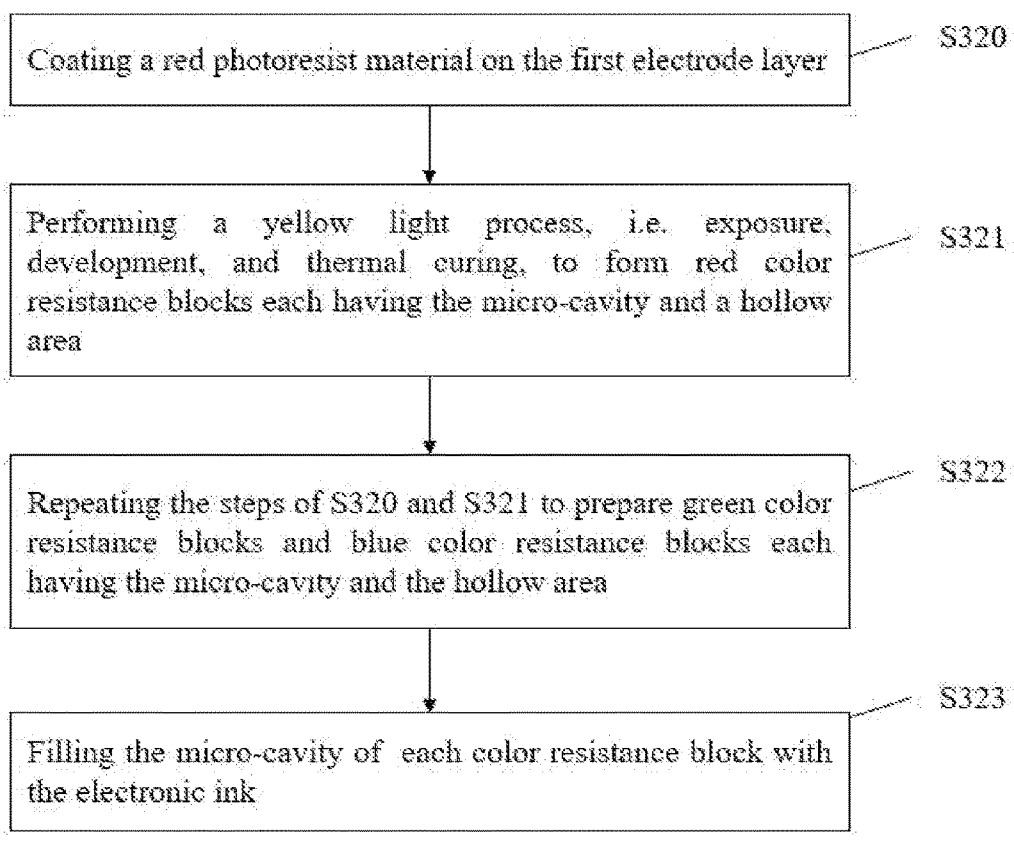

| | |
|---|---|
| Coating a red photoresist material on the first electrode layer | S320 |
| Performing a yellow light process, i.e. exposure, development, and thermal curing, to form red color resistance blocks each having the micro-cavity and a hollow area | S321 |
| Repeating the steps of S320 and S321 to prepare green color resistance blocks and blue color resistance blocks each having the micro-cavity and the hollow area | S322 |
| Filling the micro-cavity of each color resistance block with the electronic ink | S323 |

FIG. 12

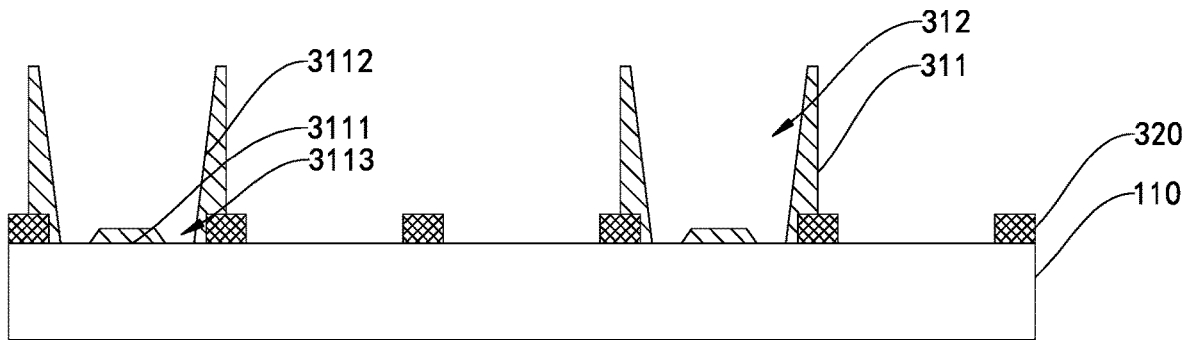

FIG. 13

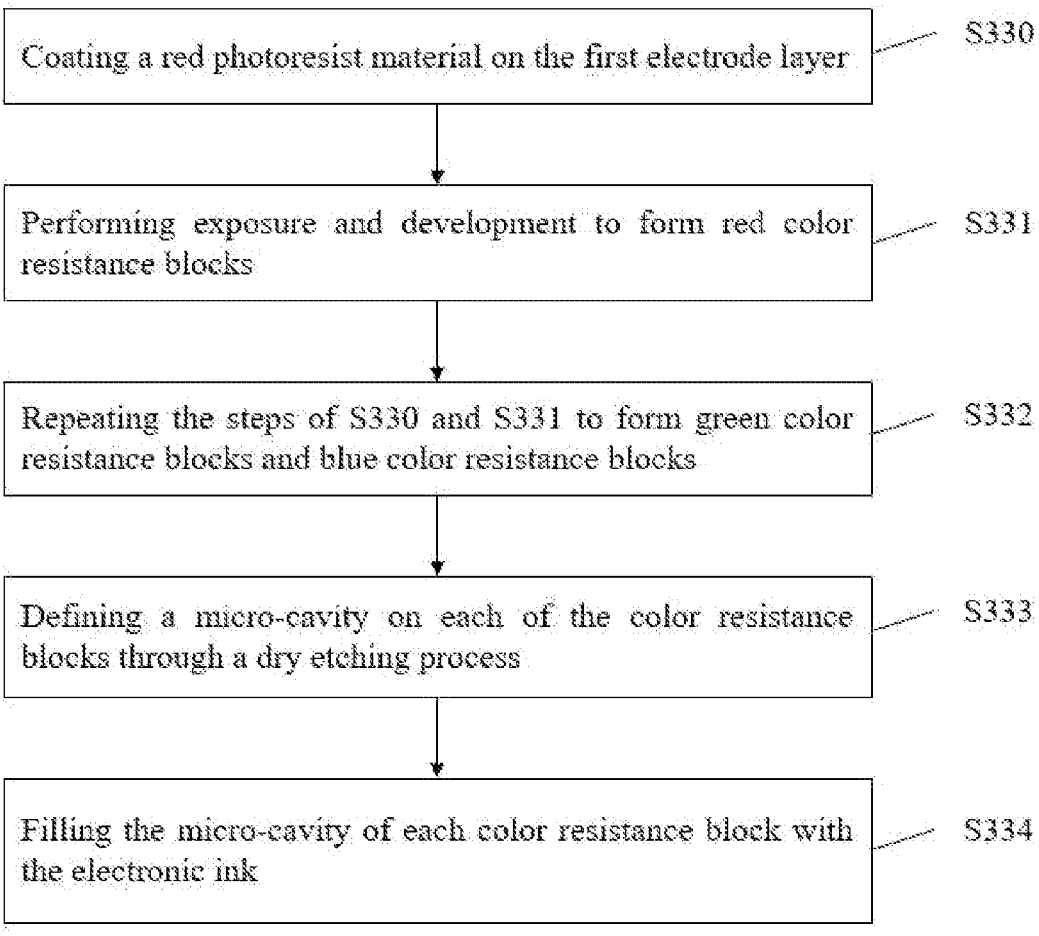

Coating a red photoresist material on the first electrode layer — S330

Performing exposure and development to form red color resistance blocks — S331

Repeating the steps of S330 and S331 to form green color resistance blocks and blue color resistance blocks — S332

Defining a micro-cavity on each of the color resistance blocks through a dry etching process — S333

Filling the micro-cavity of each color resistance block with the electronic ink — S334

FIG. 17

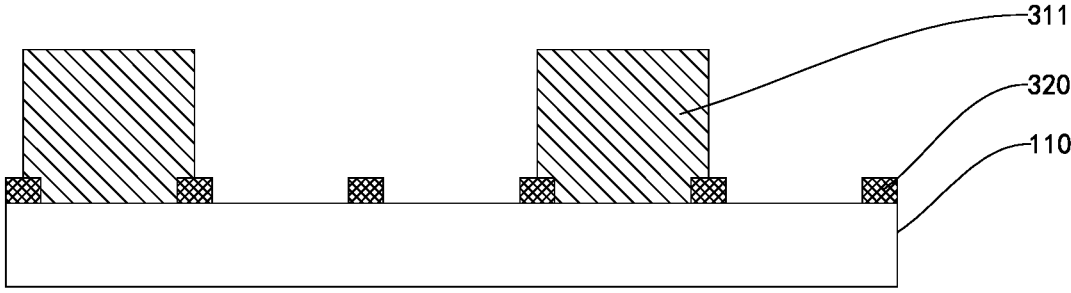

FIG. 18

ELECTRONIC PAPER DISPLAY DEVICES AND MANUFACTURING METHODS THEREOF

CROSS-REFERENCE TO RELATED APPLICATION

This application claims priority to Chinese Patent Application No. 202311451525.2, filed on Nov. 2, 2023, the disclosure of which is incorporated herein by reference in its entirety.

TECHNICAL FIELD

The present disclosure relates to the field of display technologies, and in particular, to electronic paper display devices and manufacturing methods of the electronic paper display device.

BACKGROUND

Electronic paper (E-paper) display device is a new type of display material, which relates to a bistable display technology based on the principle of electrophoresis, is versatile, and has excellent performance such as ultra-low energy consumption, being as thin as paper, bendable, and book-like clarity. The electronic paper display device displays text and images through black and white color, and depth and light changes, and the display effect is very similar to that of real paper books. In related art, electronic paper display devices are widely used in electronic readers (e-books), electronic price tags, smart cards, watches, mobile phones, industrial instruments, meters, dynamic display billboards, media products and other fields.

As people's requirements for display technology become higher and higher, the technology development of electronic paper display devices has entered the era of colorization. In the related art, particles of different colors are built into micro-cups or micro-capsules, and finally colors are realized under driving coordination, but it has the disadvantages of long response time and slow response. Generally, adding a color filter film to a black and white electronic paper display device is the most mature solution and suitable for mass production. However, the color electronic paper display device includes a multi-layer encapsulation layer, a color filter layer, an adhesive layer, an electrode layer, a driving layer, a substrate, and other structures, and it has problems of multiple film layers, thick thickness, and complex structure.

SUMMARY

In view of above, electronic paper display devices are provided according to embodiments of the present disclosure. The electronic paper display device includes an upper substrate, a lower substrate, and an electrophoretic display layer; a side of the upper substrate is provided with a first electrode layer thereon; a side of the lower substrate facing the first electrode layer is provided with a second electrode layer thereon; the first electrode layer and the second electrode layer are arranged opposite to each other at a preset interval; the electrophoretic display layer is disposed between the first electrode layer and the second electrode layer, and includes a color resistance layer and a black matrix; the black matrix has openings, the color resistance layer includes a plurality of color resistance blocks arranged corresponding to the openings; each color resistance block is provided with a micro-cavity, and the micro-cavity is filled with electronic ink containing black and white particles.

Manufacturing methods of an electronic paper display device are also provided according to embodiments of the present disclosure. The manufacturing method includes: providing an upper substrate and a lower substrate; forming a first electrode layer on the upper substrate; forming a black matrix and color resistance blocks on the first electrode layer, defining a micro-cavity in each of the color resistance blocks, and injecting electronic ink into the micro-cavity to form an electrophoretic display layer; forming a second electrode layer on the lower substrate; and assembling the upper substrate and the lower substrate with the electrophoretic display layer therebetween to form the electronic paper display device.

BRIEF DESCRIPTION OF THE DRAWINGS

In order to explain the technical solutions in the embodiments of the present disclosure more clearly, the following will briefly introduce the drawings needed to describe the embodiments. Obviously, the drawings in the following description are only some embodiments of the present disclosure. For those skilled in the art, other drawings may be obtained based on these drawings without exerting creative efforts.

In order to have a more complete understanding of the present disclosure and its beneficial effects, the following description will be made in conjunction with the accompanying drawings. Here, the same reference numerals in the following description represent the same parts.

FIG. 6 is a flow chart of a manufacturing method of an electronic paper display device according to embodiments of the present disclosure.

FIG. 7 is a flow chart of a specific manufacturing method of a step S3 in FIG. 6.

FIG. 8 is a cross-sectional view of a structure formed in a step S310 in FIG. 7.

FIG. 12 is another flow chart of a specific manufacturing method of the step S3 in FIG. 6.

FIG. 13 is a cross-sectional view of a structure formed in a step S321 in FIG. 12.

FIG. 17 is another flow chart of a specific manufacturing method of the step S3 in FIG. 6.

FIG. 18 is a cross-sectional view of a structure formed in a step S331 in FIG. 17.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

Embodiments of the present disclosure provide electronic paper display devices and manufacturing methods thereof to solve the problems of multiple film layers, thick thickness, and complex structure in existing color electronic paper display devices. The following will be described with reference to the accompanying drawings.

Figure 1:
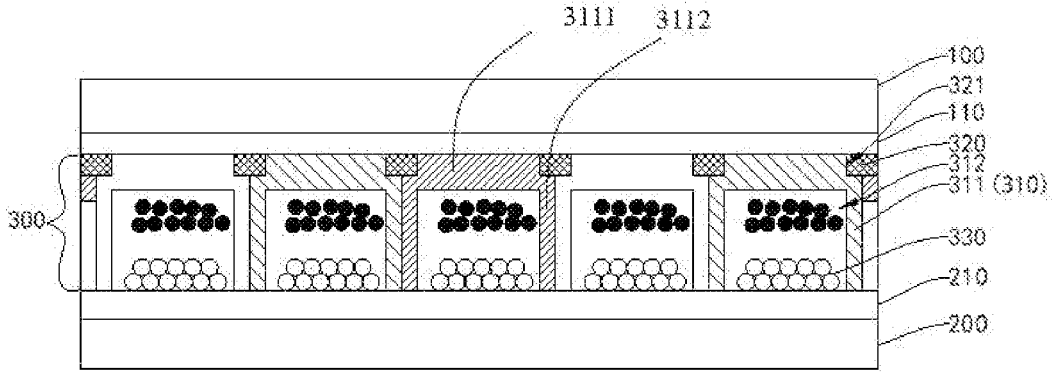
FIG. 1 is a first cross-sectional view of an electronic paper display device according to embodiments of the present disclosure.

Referring to FIG. 1, which is a first cross-sectional view of an electronic paper display device according to embodiments of the present disclosure. The electronic paper display device includes an upper substrate 100, a lower substrate 200, and an electrophoretic display layer 300.

In an embodiment, the upper substrate 100 may be a glass substrate. The glass substrate has the advantages of good flatness and resistance to deformation. A first electrode layer 110 is provided on a side of the upper substrate 100. The first electrode layer 110 is made of a transparent material, such as made of indium tin oxide (ITO).

In an embodiment, the lower substrate 200 is a driving substrate, i.e. an array substrate, and a second electrode layer 210 is provided on a side of the lower substrate 200 facing the first electrode layer 110. The first electrode layer 110 and the second electrode layer 210 are arranged opposite to each other at a preset interval.

In an embodiment, the electrophoretic display layer 300 is disposed between the first electrode layer 110 and the second electrode layer 210. The electrophoretic display layer 300 includes a color resistance layer 310 and a black matrix 320, which are disposed on a side of the first electrode layer 110 away from the upper substrate 100. In other embodiments, the black matrix 320 and the color resist layer 310 may also be disposed on a side of the second electrode layer 210 away from the lower substrate 100. The black matrix 320 has openings 321. The color resistance layer 310 includes a plurality of color resistance blocks 311 arranged corresponding to the openings 321 to avoid cross-color between adjacent color resistance blocks 311. Each color resistance block 311 is provided with a micro-cavity 312 filled with electronic ink 330 containing black and white particles. It can be understood that a display area of the electronic paper display device is formed by multiple pixels, each pixel includes multiple sub-pixel areas, the multiple sub-pixel areas include first sub-pixel areas, second sub-pixel areas, and third sub-pixel areas, and each sub-pixel area corresponds to one color resistance block 311. Side walls of the color resistance blocks 311 are used to block the electronic ink 330 in adjacent sub-pixel areas. Colors of the blocking blocks 311 corresponding to the first sub-pixel area, the second sub-pixel area, and the third sub-pixel area are red, green, and blue, respectively.

In the embodiments of the present disclosure, the first electrode layer 110 and the second electrode layer 210 in the sub-pixel areas of the electronic paper display device may be configured to load different potentials, so that the particles inside the electronic ink 330 in the corresponding sub-pixel areas take on different forms of aggregation, and the color of the electronic paper display device is realized after filtering through the corresponding color resistance blocks 311. The color resistance block 311 has the micro-cavity 312 filled with the electronic ink 330 of black and white particles, thus a micro-cup structure is formed by the color resistance block 311, which simplifies an encapsulation structure of the electronic paper display device. Therefore, the problems of multiple film layers, thick thickness, and complex structure in related art are relieved, and the electronic paper display device in the present disclosure has the advantages of simple structure, thin thickness, and simple processing technology.

Figure 2:
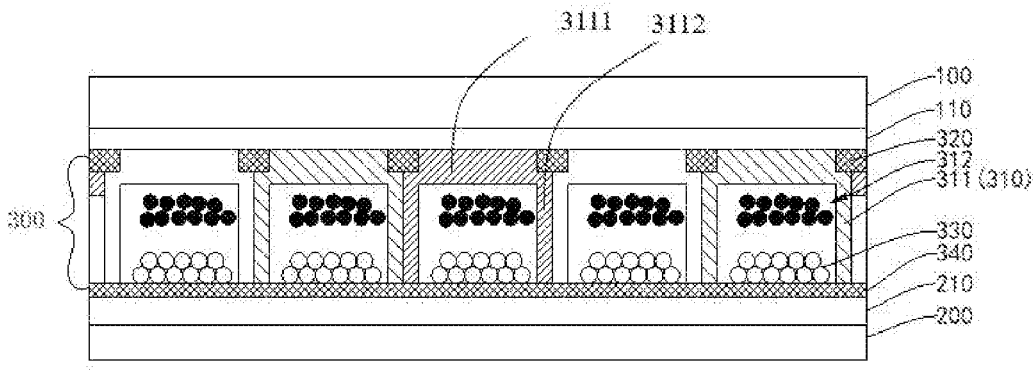
FIG. 2 is a second cross-sectional view of an electronic paper display device according to embodiments of the present disclosure.

In some embodiments, as illustrated in FIG. 2, the electrophoretic display layer 300 also includes a black matrix layer 340. A material of the black matrix layer 340 may be organic photoresist, inorganic light-shielding material, or light-absorbing material, such as silver coated film, Bragg reflective film, or acrylic resin. One side of the black matrix layer 340 is bonded to the side of the second electrode layer 210 away from the lower substrate 200, and the other side of the black matrix layer 340 is connected to the color resist layer 310.

Since the black matrix layer 340 is formed on the second electrode layer 210, so that when external light is injected into the micro-cavity 312 through the color resistance block 311, the particles of the electronic ink 330 in the micro-cavity 312 may reflect a part of the light out of the color resistance block 311, and another part of the light is absorbed or reflected by the black matrix layer 340, thus avoiding reflection by the array substrate and the second electrode layer 210 below the black matrix layer 340, which improves the contrast of the electronic paper display device.

Figure 3:
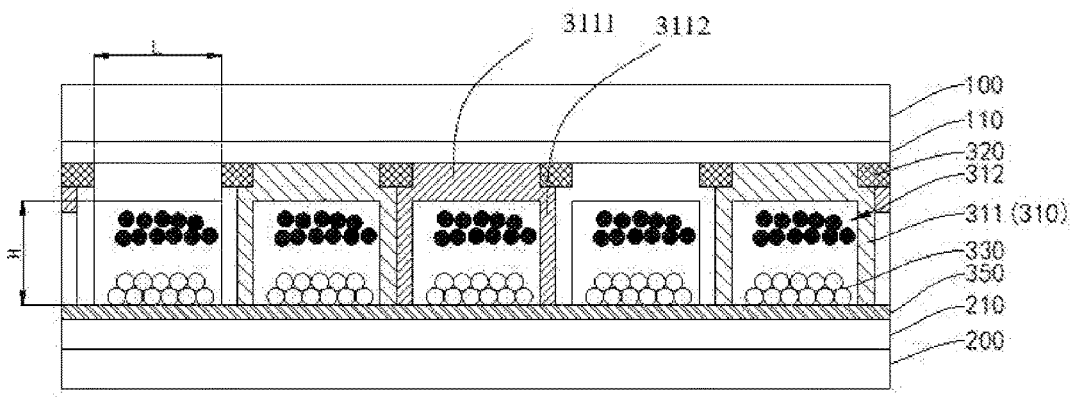
FIG. 3 is a third cross-sectional view of an electronic paper display device according to embodiments of the present disclosure.
Figure 4:
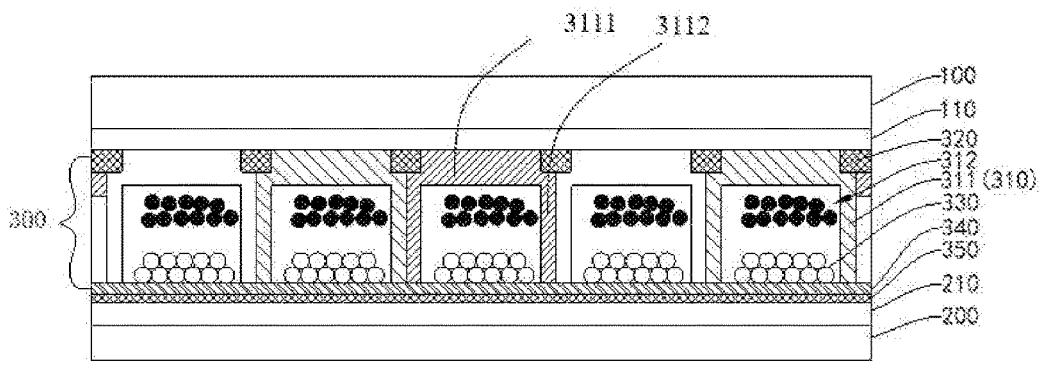
FIG. 4 is a fourth cross-sectional view of an electronic paper display device according to embodiments of the present disclosure.

In some embodiments, as illustrated in FIG. 3 and FIG. 4, the electrophoretic display layer 300 further includes an encapsulation layer 350 located on a side of the color resist layer 310 away from the upper substrate 100 and blocking notches of the micro-cavities 312. It can be understood that when the black matrix layer 340 is not provided, a side of the encapsulation layer 350 away from the color resist layer 310 is attached to the second electrode layer 210, as illustrated in FIG. 3. Referring to FIG. 4, when the black matrix layer 340 is provided, the encapsulation layer 350 is made of light-transmitting material, and the side of the encapsulating layer 350 away from the color resist layer 310 is bonded to the black matrix layer 340. Since the notches of the micro-cavities 313 are blocked by the encapsulation layer 350, so that the color resistance block 311 and the encapsulation layer 350 form a sealed space. A material of the encapsulation layer 350 may be acrylic resin material, epoxy acrylic, or silicone, etc. The electronic ink 330 is located in the sealed space to prevent the electronic ink 330 from leaking.

In some embodiments, a range of a depth H of the micro-cavity 312 is 5 $\mu m \leq H \leq 30$ $\mu m$. The depth H of the micro-cavity 312 may be 5 $\mu m$, 10 $\mu m$, 15 $\mu m$, 20 $\mu m$, 25 $\mu m$, 30 $\mu m$, or other undisclosed values.

In some embodiments, a range of a width L of the micro-cavity 312 is 100 μm≤L≤300 μm. The width L of the micro-cavity 312 may be 100 μm, 110 μm, 120 μm, 150 μm, 200 μm, 250 μm, 28 μm, 300 μm, or other undisclosed values.

It can be understood that by reasonably setting the depth and width of the micro-cavity 312, thus an amount of the electronic ink 330 filled in the micro-cavity 312 may be limited by the volume of the micro-cavity 312. The depth and width of the micro-cavity 312 may be set according to a required size of the sub-pixel area.

In some embodiments, as illustrated in FIG. 1 to FIG. 4, the color resistance block 311 includes a top portion 3111 and a side portion 3112. The top portion 3111 and the side portion 3112 are integrally formed. The top portion 3111 is slightly thicker than the black matrix 320. The top portion 3111 and the side portion 3112 are connected to define the micro-cavity 312. The top portion 3111 is attached to the first electrode layer 110.

In some embodiments, along a thickness direction of the color resistance block 311, a cross-sectional shape of the micro-cavity 312 may be rectangular or trapezoidal. Along a top view direction, a cross-sectional shape of the micro-cavity 312 may be rectangular or circular. The micro-cavity 312 may be a cube or a cone table.

Figure 5:
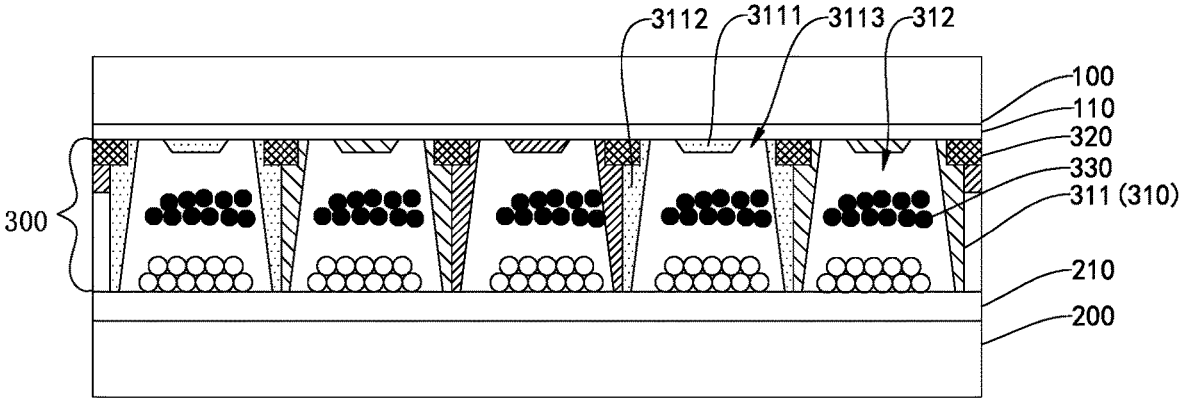
FIG. 5 is a fifth cross-sectional view of an electronic paper display device according to embodiments of the present disclosure.

On the basis of the above embodiments, as illustrated in FIG. 5, the top portion 3111 is provided with a hollow area 3113, which is communicated with the micro-cavity 312. Along the top view direction, a shape of the hollow area 3113 is a rectangular ring or annular ring. A physical structure of the top portion 3111 is located inside the hollow area 3113, and the hollow area 3113 is close to a surrounding portion of the black matrix 320.

It can be understood that a part of the light reflected by the electronic ink 330 emits from the hollow areas 3113, which reduces light loss and improves the reflectivity of the electronic paper display device.

Referring to FIG. 6, embodiments of the present disclosure also provide manufacturing methods of an electronic paper display device, which are configured to to form the electronic paper display device in any one of the above embodiments. The manufacturing method includes following steps of S1, S2, S3, S4, and S5.

The step S1 includes: providing an upper substrate 100 and a lower substrate 200.

The step S2 includes: forming a first electrode layer 110 on the upper substrate 100.

The step S3 includes: forming a black matrix 320 and color resistance blocks 311 on the first electrode layer 110, defining a micro-cavity 312 in each of the color resistance blocks 311, and injecting electronic ink 330 into each of the micro-cavities 312 to form an electrophoretic display layer 300.

The step S4 includes: forming a second electrode layer 210 on the lower substrate 200.

The step S5 includes: assembling the upper substrate 100 in the step S3 and the lower substrate 200 in the step S4 with the electrophoretic display layer 300 disposed between the first electrode layer 110 and the second electrode layer 210 to form an electronic paper display device.

In some embodiments, as illustrated in FIG. 7, the S3 includes following specific steps of S310, S311, S312, and S313.

The step S310 includes: coating a red photoresist material on the first electrode layer 110.

As illustrated in FIG. 8, a structure formed in the step S310 includes a glass substrate, the first electrode layer 110, the black matrix 320, and a red photoresist material. The red photoresist material covers the black matrix 320.

The step S311 includes: performing a yellow light process, i.e. exposure, development, and thermal curing, to form red color resistance blocks 311 each having the micro-cavity 312.

Figure 9:
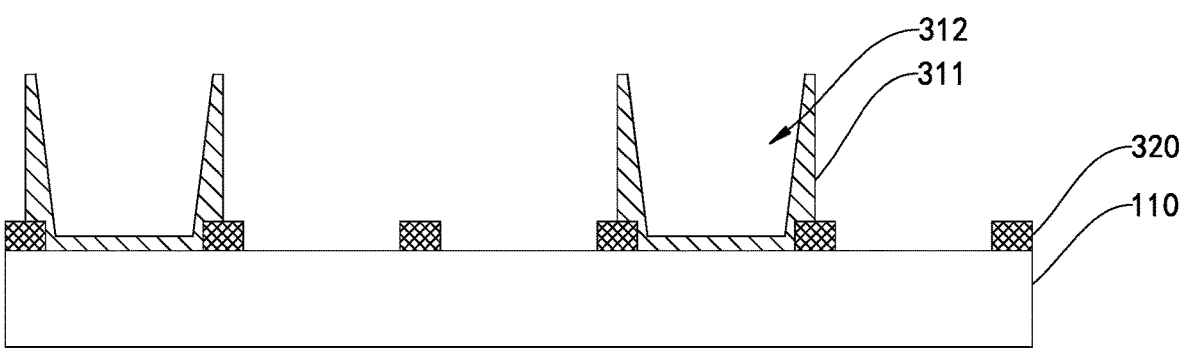
FIG. 9 is a cross-sectional view of a structure formed in a step S311 in FIG. 7.

As illustrated in FIG. 9, a structure formed in the step S311 includes the glass substrate, the first electrode layer 110, the black matrix 320, and a plurality of red color resistance blocks 311. The micro-cavity 312 is formed in each red color resistance block 311. A cross-sectional shape of the micro-cavity 312 is trapezoidal, and the micro-cavity 312 has a width at the notch greater than a width at the bottom. Adjacent color resistance blocks 311 are spaced apart.

The step S312 includes: repeating the steps of S310 and S311 to form green color resistance blocks 311 each having the micro-cavity 312 and blue color resistance blocks 311 each having the micro-cavity 312.

Figure 10:
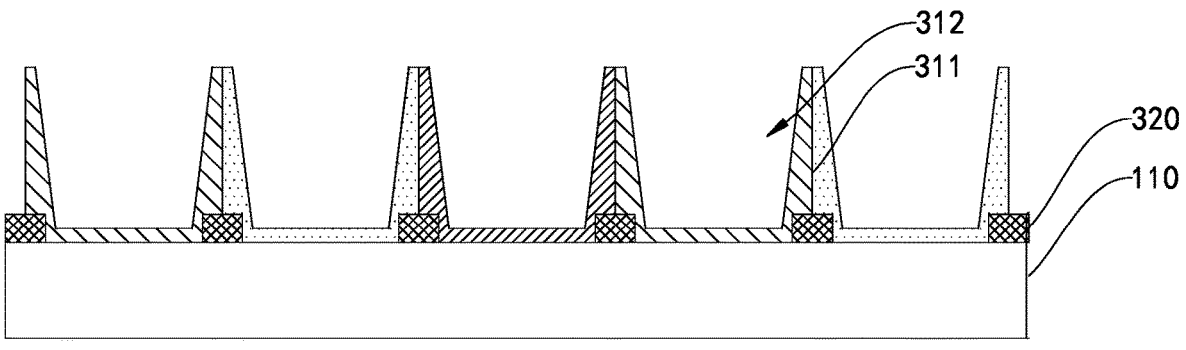
FIG. 10 is a cross-sectional view of a structure formed in a step S312 in FIG. 7.

As illustrated in FIG. 10, a structure formed in the step S312 includes the glass substrate, the first electrode layer 110, the black matrix 320, and a plurality of color resistance blocks 311. The micro-cavity 312 is formed in each color resistance block 311. A cross-sectional shape of the micro-cavity 312 is trapezoidal, and the micro-cavity 312 has a width at the notch greater than a width at the bottom. The red, green, and blue color resistance blocks 311 are arranged and repeated in sequence.

The step S313 includes: filling the micro-cavity 312 of each color resistance block 311 with the electronic ink 330.

Figure 11:
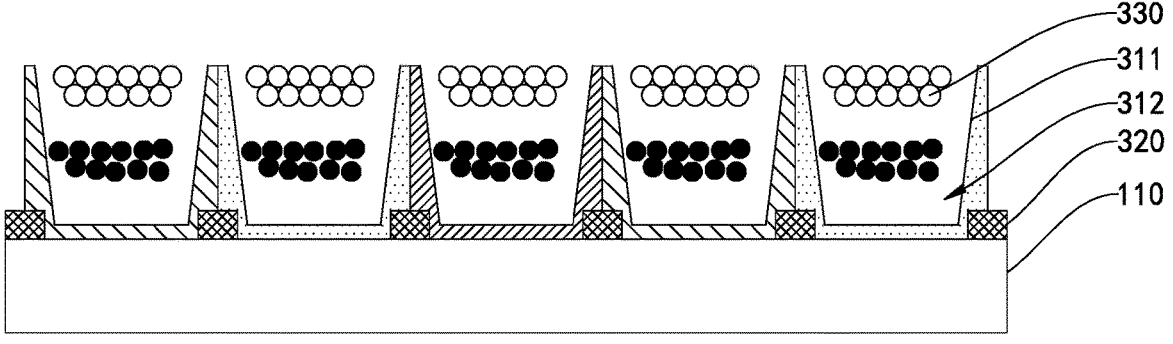
FIG. 11 is a cross-sectional view of a structure formed in a step S313 in FIG. 7.

Referring to FIG. 11, the electrophoretic display layer 300 formed in the step S313 includes the color resistance layer 310 and the black matrix 320. The black matrix 320 has openings 321. The color resistance layer 310 includes the plurality of color resistance blocks 311. The color resistance blocks 311 are arranged corresponding to the openings 321. Each color resistance block 311 is provided with the micro-cavity 312. The notch of the micro-cavity 312 faces the second electrode layer 210. The micro-cavity 312 is filled with the electronic ink 330.

In some embodiments, as illustrated in FIG. 12, the S3 includes following specific steps of S320, S321, S322, and S323.

The step S320 includes: coating a red photoresist material on the first electrode layer 110.

As illustrated in FIG. 8, a structure formed in the step S320 includes the glass substrate, the first electrode layer 110, the black matrix 320, and a red photoresist material. The red photoresist material covers the black matrix 320.

The step S321 includes: performing a yellow light process, i.e. exposure, development, and thermal curing, to form red color resistance blocks 311 each having the micro-cavity 312 and a hollow area 3113.

As illustrated in FIG. 13, a structure formed in the step S321 includes the glass substrate, the first electrode layer 110, the black matrix 320, and a plurality of red color resistance blocks 311. The micro-cavity 312 is formed in the red color resistance block 311. An annular hollow area 3113 is defined on the bottom of the micro-cavity 312. The cross-sectional shape of the micro-cavity 312 is a trapezoid, and the micro-cavity 312 has a width at the notch greater than the width of the bottom. Adjacent color resistance blocks 311 are spaced apart.

The step S322 includes: repeating the steps of S320 and S321 to form green color resistance blocks 311 and blue color resistance blocks 311 each having the micro-cavity 312 and the hollow area 3113.

Figure 14:
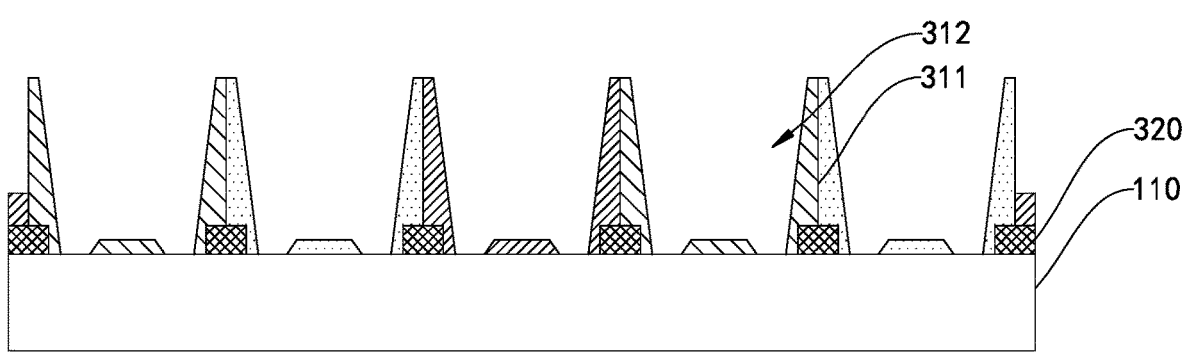
FIG. 14 is a cross-sectional view of a structure formed in a step S322 in FIG. 12.
Figure 15:
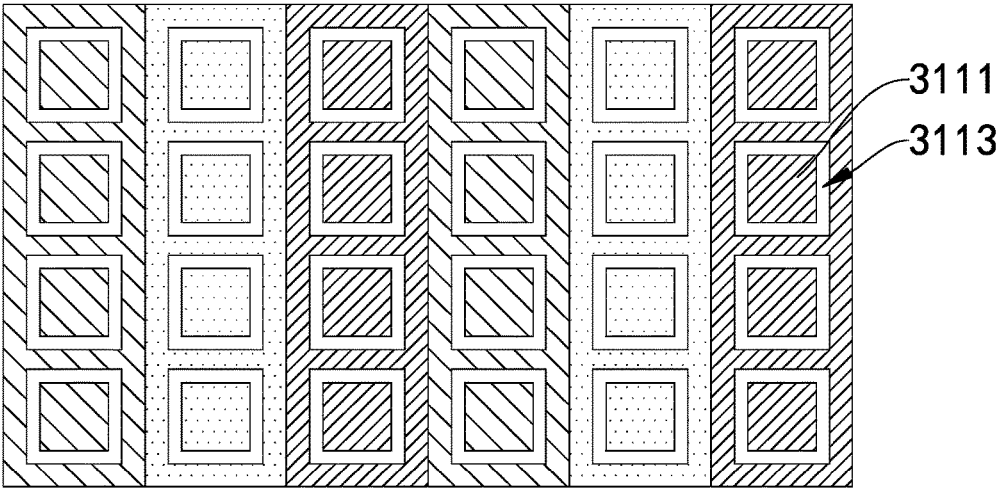
FIG. 15 is a top view of the structure formed in the step S322 in FIG. 12.

Referring to FIG. 14 and FIG. 15, a structure formed in the step S322 includes the glass substrate, the first electrode layer 110, the black matrix 320, and a plurality of color resistance blocks 311, each of which has the micro-cavity 312 defined therein. An annular hollow area 3113 is formed on the bottom of the micro-cavity 312. The cross-sectional shape of the micro-cavity 312 is a trapezoid, and the micro-cavity 312 has a width at the notch greater than the width of the bottom. The red, green, and blue color resistance blocks 311 are arranged and repeated in sequence.

The step S323 includes: filling the micro-cavity 312 of each color resistance block 311 with the electronic ink 330.

Figure 16:
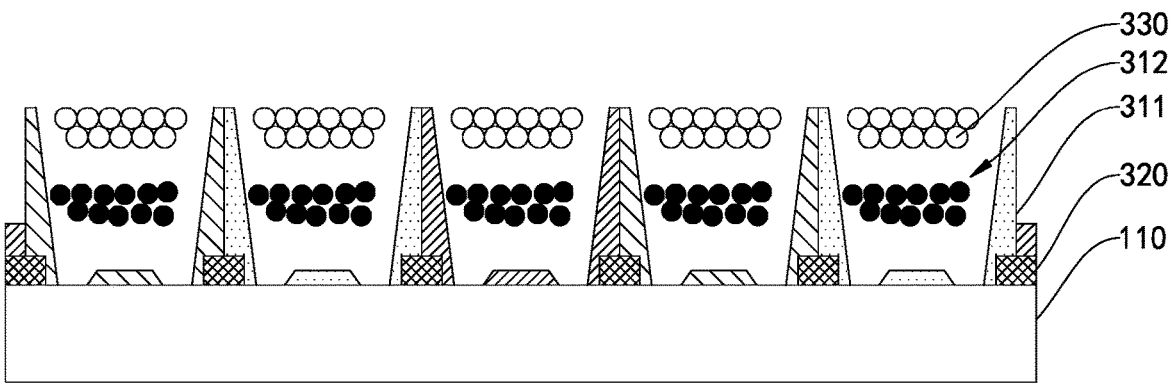
FIG. 16 is a cross-sectional view of a structure formed in a step S323 in FIG. 12.

Referring to FIG. 16, the electrophoretic display layer 300 formed in the step S323 includes a color resistance layer 310 and the black matrix 320. The black matrix 320 has openings 321. The color resistance layer 310 includes a plurality of color resistance blocks 311. The color resistance blocks 311 are arranged corresponding to the openings 321. Each color resistance block 311 is provided with the micro-cavity 312. The notch of the micro-cavity 312 faces the second electrode layer 210. The micro-cavity 312 is filled with electronic ink 330.

In the embodiments, by adjusting the amount of laser light, and masks with different transmittances are used for illumination. A mask spacing size is the same as a size of the sub-pixel area, so different amount of laser light received by different areas may be achieved under the same illumination time. The color resistance blocks 311 each having h the micro-cavity 312 or the color resistance blocks 311 each having the micro-cavity 312 and the hollow area 3113 are directly formed, so the preparation processes are simplified, the processing technology is simple, and the processing costs is reduced. The hollow area 3113 may also be formed on the color resistance block 311 by adjusting the amount of laser light to further simplify preparation processes.

In some embodiments, as illustrated in FIG. 17, the S3 includes following specific steps of S330, S331, S332, 333, and S334.

The step S330 includes: coating a red photoresist material on the first electrode layer 110.

As illustrated in FIG. 8, a structure formed in the step S330 includes a glass substrate, the first electrode layer 110, the black matrix 320 and a red photoresist material. The red photoresist material covers the black matrix 320.

The step S331 includes: performing exposure and development to form red color resistance blocks 311.

As illustrated in FIG. 18, a structure formed in the step S331 includes the glass substrate, the first electrode layer 110, the black matrix 320, and red color resistance blocks 311. The color resistance blocks 311 are located inside openings of the black matrix 320 on the first electrode layer 110.

The step S332 includes: repeating the steps of S330 and S331 to form green color resistance blocks 311 and blue color resistance blocks 311.

Figure 19:
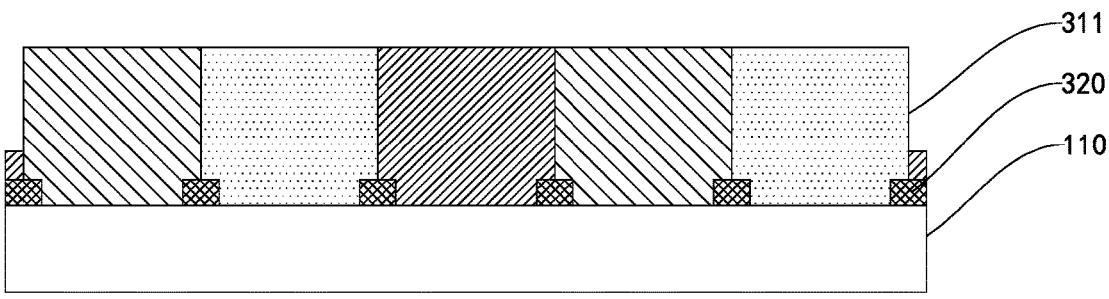
FIG. 19 is a cross-sectional view of a structure formed in a step S332 in FIG. 17.

As illustrated in FIG. 19, a structure formed in the step S332 includes the glass substrate, the first electrode layer 110, the black matrix 320, and a plurality of red, green and blue color resistance blocks 311. The color resistance blocks 311 are located inside openings of the black matrix 320 on the first electrode layer 110. The plurality of color resistance blocks 311 are arranged and repeated in order of red, green, and blue.

The step S333 includes: defining a micro-cavity 312 on each of the color resistance blocks 311 through a dry etching process.

Figure 20:
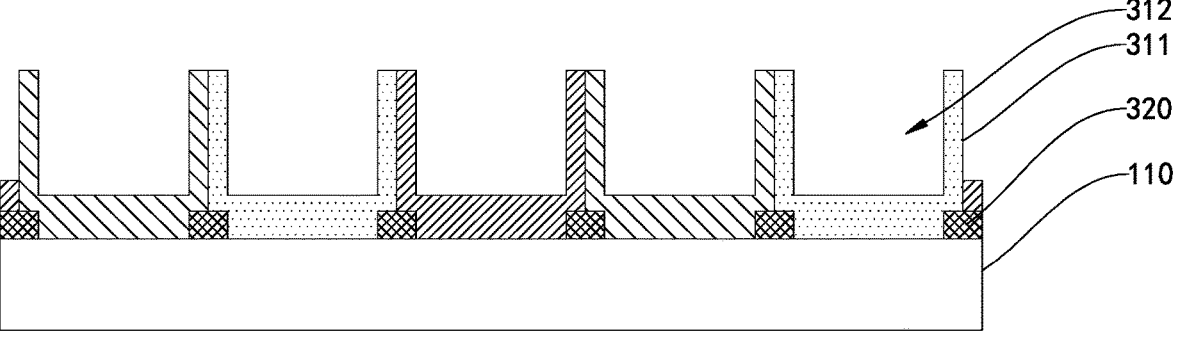
FIG. 20 is a top view of the structure formed in the step S332 in FIG. 17.

As illustrated in FIG. 20, a structure formed in the step S333 includes the glass substrate, the first electrode layer 110, the black matrix 320, and the plurality of red, green and blue color resistance blocks 311. Each color resistance block 311 is provided with the micro-cavity 312. The cross-sectional shape of the micro-cavity 312 is rectangular, and a wall thickness of all the color resistance blocks 311 is the same.

The step S334 includes: filling the micro-cavity 312 of each color resistance block 311 with the electronic ink 330.

Figure 21:
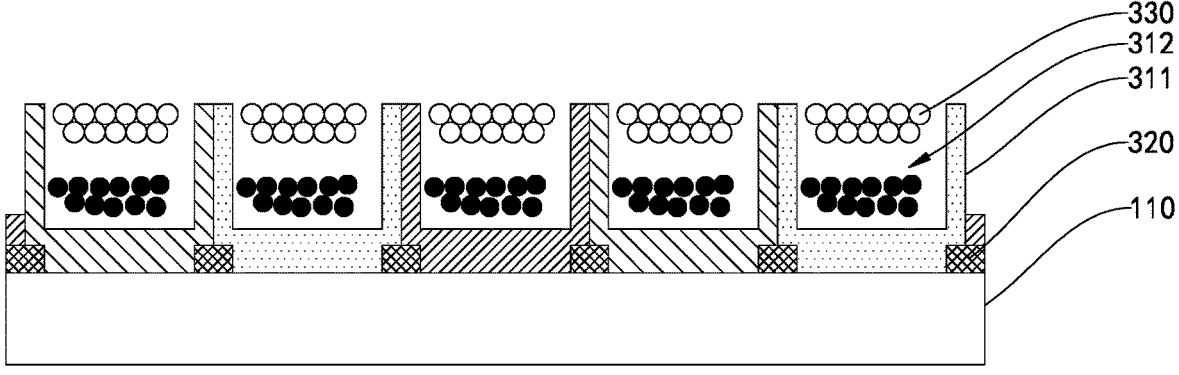
FIG. 21 is a cross-sectional view of a structure formed in a step S343 in FIG. 17.

Referring to FIG. 21, the electrophoretic display layer 300 formed in the step S334 includes the color resistance layer 310 and the black matrix 320. The black matrix 320 has openings 321. The color resistance layer 310 includes the plurality of color resistance blocks 311. The color resistance blocks 311 are arranged corresponding to the openings 321. Each color resistance block 311 is provided with the micro-cavity 312. The notch of the micro-cavity 312 faces the second electrode layer 210. The micro-cavity 312 is filled with the electronic ink 330.

In the embodiments of the present disclosure, the color resist layer 310 of various colors is first processed, and then the micro-cavities 312 are etched uniformly, which simplifying the processes.

In the above embodiments, each embodiment is described with its own emphasis. For parts that are not described in detail in a certain embodiment, please refer to the relevant descriptions of other embodiments.

In the description of the present disclosure, the terms "first" and "second" are used for descriptive purposes only, and cannot be understood as indicating or implying relative importance or implicitly indicating the number of indicated technical features. Therefore, the features defined as "first" and "second" may explicitly or implicitly include one or more features.

The electronic paper display devices and the manufacturing methods thereof provided by the embodiments of the present disclosure are introduced in detail above. Specific examples are used in this paper to illustrate the principles and implementation methods of the present disclosure. The description of the above embodiments is only used to help understand methods and core ideas of the present disclosure. At the same time, for those skilled in the art, there may be changes in the specific implementation and application scope based on the ideas of the present disclosure. In summary, the content of this description should not be understood as a limitation of the present disclosure.

What is claimed is:

1. An electronic paper display device, comprising: an upper substrate; a first electrode layer, disposed on a side of the upper substrate; a lower substrate; a second electrode layer, disposed on a side of the lower substrate facing the first electrode layer, and arranged opposite to the first electrode layer at a preset interval; and an electrophoretic display layer, disposed between the first electrode layer and the second electrode layer, and comprising: a black matrix, comprising openings; and a color resistance layer, comprising a plurality of color resistance blocks arranged corresponding to the openings, wherein each of the color resistance blocks is provided with a micro-cavity, and the micro-cavity is filled with electronic ink containing black and white particles.

2. The electronic paper display device according to claim 1, further comprising:
   a black matrix layer, disposed on a side of the second electrode layer away from the lower substrate.

3. The electronic paper display device according to claim 1, further comprising:

an encapsulation layer, disposed on a side of the color resistance layer away from the upper substrate, and blocking a notch of the micro-cavity.

4. The electronic paper display device according to claim 1, wherein a depth of the micro-cavity ranges between 5 μm and 30 μm.

5. The electronic paper display device according to claim 1, wherein a width of the micro-cavity ranges between 100 μm and 300 μm.

6. The electronic paper display device according to claim 1, wherein a depth of the micro-cavity ranges between 5 μm and 30 μm; and a width of the micro-cavity ranges between 100 μm and 300 μm.

7. The electronic paper display device according to claim 1, wherein the upper substrate is a glass substrate, the lower substrate is a driving substrate, and the electrophoretic display layer is disposed on the upper substrate.

8. The electronic paper display device according to claim 1, wherein each of the color resistance blocks comprises a top portion and a side portion, the top portion and the side portion are connected to define the micro-cavity, and the top portion is attached to the first electrode layer.

9. The electronic paper display device according to claim 8, wherein the top portion and the side portion are integrally formed.

10. The electronic paper display device according to claim 8, wherein the top portion is provided with a hollow area communicated with the micro-cavity.

11. The electronic paper display device according to claim 10, wherein a shape of the hollow area is a rectangular ring or annular ring.

12. The electronic paper display device according to claim 1, wherein along a thickness direction of the electrophoretic display layer, a cross-sectional shape of the micro-cavity is rectangular or trapezoidal.

13. The electronic paper display device according to claim 1, wherein the micro-cavity has a width at the notch greater than a width at the bottom.

14. A method of manufacturing an electronic paper display device, comprising: providing an upper substrate and a lower substrate; forming a first electrode layer on the upper substrate; forming a black matrix and color resistance blocks on the first electrode layer, defining a micro-cavity in each of the color resistance blocks, and injecting electronic ink into the micro-cavity to form an electrophoretic display layer; forming a second electrode layer on the lower substrate; and assembling the upper substrate and the lower substrate with the electrophoretic display layer therebetween to form the electronic paper display device.

15. The method of manufacturing the electronic paper display device according to claim 14, wherein a step of forming the black matrix and the color resistance blocks on the first electrode layer, defining the micro-cavity in each of the color resistance blocks, and injecting the electronic ink into the micro-cavity to form the electrophoretic display layer comprises: coating a red photoresist material on the first electrode layer; performing a yellow light process to form red color resistance blocks each having the micro-cavity; coating color photoresist materials and performing a yellow light process to form green color resistance blocks and blue color resistance blocks each having the micro-cavity; and filling the micro-cavity of each of the color resistance blocks with the electronic ink.

16. The method of manufacturing the electronic paper display device according to claim 14, wherein a step of forming the black matrix and the color resistance blocks on the first electrode layer, defining the micro-cavity in each of the color resistance blocks, and injecting the electronic ink into the micro-cavity to form the electrophoretic display layer comprises: coating a red photoresist material on the first electrode layer; performing a yellow light process to form red color resistance blocks each having the micro-cavity and a hollow area; coating color photoresist materials and performing a yellow light process to form green color resistance blocks and blue color resistance blocks each having the micro-cavity and the hollow area; and filling the micro-cavity of each of the color resistance blocks with the electronic ink.

17. The method of manufacturing the electronic paper display device according to claim 14, wherein a step of forming the black matrix and the color resistance blocks on the first electrode layer, defining the micro-cavity in each of the color resistance blocks, and injecting the electronic ink into the micro-cavity to form the electrophoretic display layer comprises: coating a red photoresist material on the first electrode layer; performing exposure and development to form red color resistance blocks; coating color photoresist materials and performing exposure and development to form green color resistance blocks and blue color resistance blocks; defining the micro-cavity on each of the color resistance blocks through a dry etching process; and filling the micro-cavity of each of the color resistance blocks with the electronic ink.

18. The method of manufacturing the electronic paper display device according to claim 17, wherein, before the step of filling the micro-cavity of each of the color resistance blocks with the electronic ink, the manufacturing method further comprises the step of: defining a hollow area on each of the color resistance blocks through a dry etching process.

* * * * *